United States Patent
Guo et al.

(10) Patent No.: US 9,655,156 B2
(45) Date of Patent: May 16, 2017

(54) BEARER ESTABLISHMENT METHOD, BASE STATION, PACKET DATA GATEWAY, AND COMPUTER SYSTEM

(71) Applicant: HUAWEI TECHNOLOGIES CO., LTD., Shenzhen (CN)

(72) Inventors: Yali Guo, Shenzhen (CN); Weihua Zhou, Shenzhen (CN); Wanqiang Zhang, Beijing (CN); Xiaobo Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 81 days.

(21) Appl. No.: 14/619,483

(22) Filed: Feb. 11, 2015

(65) Prior Publication Data
US 2015/0156807 A1 Jun. 4, 2015

Related U.S. Application Data

(63) Continuation of application No. PCT/CN2012/080296, filed on Aug. 17, 2012.

(51) Int. Cl.
*H04W 76/02* (2009.01)

(52) U.S. Cl.
CPC ................. *H04W 76/023* (2013.01)

(58) Field of Classification Search
None
See application file for complete search history.

(56) References Cited

U.S. PATENT DOCUMENTS

| 8,577,363 B2 * | 11/2013 | Wijting | H04W 76/023 455/426.1 |
| 8,892,092 B2 * | 11/2014 | Wijting | H04W 76/023 455/426.1 |

(Continued)

FOREIGN PATENT DOCUMENTS

| CN | 1619993 | 5/2005 |
| CN | 101772199 | 7/2010 |
| CN | 102379107 | 3/2012 |
| WO | WO 2010/007498 A1 | 1/2010 |

OTHER PUBLICATIONS

Extended European Search Report dated Oct. 14, 2015 in corresponding European Patent Application No. 12883020.5.

(Continued)

*Primary Examiner* — Ayaz Sheikh
*Assistant Examiner* — Faiyazkhan Ghafoerkhan
(74) *Attorney, Agent, or Firm* — Staas & Halsey LLP

(57) ABSTRACT

The present invention provides a bearer establishment method, a base station, a packet data gateway, and a computer system, where the bearer establishment method includes: receiving a D2D mode indication requested by an AF entity or a proximity service server for a source UE, where the D2D mode indication includes a first D2D connection establishment mode or a second D2D connection establishment mode; and according to the D2D mode indication, when a D2D connection can be established successfully, establishing the D2D connection for the source UE; or when a D2D connection cannot be established successfully, establishing a common connection if the D2D mode indication is the first D2D connection establishment mode, and feeding back a connection establishment failure response to the AF entity or the proximity service server if the D2D mode indication is the second D2D connection establishment mode.

14 Claims, 7 Drawing Sheets

---

Receive a D2D mode indication requested by an AF entity or a proximity service server for a source UE, where the D2D mode indication includes a first D2D connection establishment mode or a second D2D connection establishment mode ~ 101

According to the D2D mode indication, when a D2D connection can be established successfully, establish the D2D connection for the source UE; or according to the D2D mode indication, when a D2D connection cannot be established successfully, establish a common connection for the source UE if the D2D mode indication is the first D2D connection establishment mode, and feed back a connection establishment failure response to the AF entity or the proximity service server if the D2D mode indication is the second D2D connection establishment mode ~ 102

(56) References Cited

U.S. PATENT DOCUMENTS

| | | | | |
|---|---|---|---|---|
| 2010/0009675 | A1* | 1/2010 | Wijting | H04W 72/02 455/426.1 |
| 2010/0268775 | A1* | 10/2010 | Doppler | H04W 4/00 709/204 |
| 2011/0145319 | A1* | 6/2011 | Dolan | H04L 47/72 709/203 |
| 2013/0287012 | A1* | 10/2013 | Pragada | H04W 76/045 370/338 |
| 2013/0288668 | A1* | 10/2013 | Pragada | H04W 12/06 455/426.1 |
| 2013/0301547 | A1* | 11/2013 | Gupta | H04W 76/048 370/329 |
| 2014/0038590 | A1* | 2/2014 | Wijting | H04W 76/023 455/426.1 |
| 2014/0301289 | A1* | 10/2014 | Johnsson | H04W 76/021 370/329 |
| 2015/0156807 | A1* | 6/2015 | Guo | H04W 76/023 370/329 |
| 2016/0021526 | A1* | 1/2016 | Niu | H04L 27/2614 370/230 |
| 2016/0044727 | A1* | 2/2016 | Zisimopoulos | H04W 48/02 455/41.2 |

OTHER PUBLICATIONS

"3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 11)", 3GPP TS 23.401, V11.2.0, Jun. 2012, pp. 1-285.

"3$^{rd}$ Generation Partnership Project; Technical Specification Group SA; Feasibility Study for Proximity Services (ProSe) (Release 12)", 3GPP TR 22.803, V0.5.0, Aug. 2012, pp. 1-34.

3rd Generation Partnership Project; Technical Specification Group Core Network and Terminals; Policy and Charging Control (PCC) over Gx/Sd reference point (Release 11) (3GPP TS 29.212 V11.5.0 (Jun. 2012)), 3GPP Organizational Partners (ARIB, ATIS, CCSA, ETSI, TTA, TTC), Jun. 2012, pp. 1-194.

3rd Generation Partnership Project; Technical Specification Group Core Network and Terminals;3GPP Evolved Packet System (EPS); Evolved General Packet Radio Service (GPRS)Tunnelling Protocol for Control plane (GTPv2-C); Stage 3 (Release 11) (3GPP TS 29.274 V11.3.0 (Jun. 2012)), 3GPP Organizational Partners (ARIB, ATIS, CCSA, ETSI, TTA, TTC), Jun. 2012, pp. 1-219.

3rd Generation Partnership Project; Technical Specification Group Radio Access Network; Evolved Universal Terrestrial Radio Access Network (E-UTRAN);S1 Application Protocol (S1AP) (Release 11) (3GPP TS 36.413 V11.0.0 (Jun. 2012)), 3GPP Organizational Partners (ARIB, ATIS, CCSA, ETSI, TTA, TTC), Jun. 2012, pp. 1-258.

International Search Report mailed Mar. 28, 2013 for corresponding International Patent Application No. PCT/CN2012/080296.

International Search Report mailed Mar. 28, 2013 in corresponding international application international application PCT/CN2012/080296.

* cited by examiner

BEARER ESTABLISHMENT METHOD, BASE STATION, PACKET DATA GATEWAY, AND COMPUTER SYSTEM

CROSS REFERENCE

This application is a continuation of International Application No. PCT/CN2012/080296, filed on Aug. 17, 2012 which is incorporated herein by reference in its entirety.

TECHNICAL FIELD

The present invention relates to the field of communications technologies, and in particular, to a bearer establishment method, a base station, a packet data gateway, and a computer system.

BACKGROUND

As social applications are widely applied, a proximity discovery function becomes increasingly important. For example, a user expects to know, in a timely manner, whether a friend appears around or leaves. The proximity discovery function makes people's life and work become more convenient. For example, after arriving at an office, a user can immediately know, by using the proximity discovery function, a colleague who is about to arrive at the office.

The proximity discovery function may be implemented by using a device to device (hereinafter referred to as D2D) communications technology. An existing D2D bearer establishment procedure is as follows: A source user equipment (hereinafter referred to as UE) initiates a D2D service to a target UE; a network carries, according to a service requirement, a D2D indication in a bearer establishment message that needs to be used to perform the D2D service, and sends the bearer establishment message to a base station; and the base station controls, according to the bearer establishment message from the network, a related UE to perform measurement and discover and establish a D2D link. If the D2D link cannot be established due to a cause such as insufficient resources or a long distance between the target UE and the source UE, the bearer establishment procedure fails, and the D2D service of the source UE cannot be established. The source UE may abandon the service or re-initiate a normal service request to the target UE.

For some services, a UE is more concerned about whether a service is established successfully rather than that D2D must be used for communication. In the prior art, because a D2D link cannot be established due to a cause such as insufficient resources and a long distance between a target UE and a source UE, a D2D service initiated by the source UE fails, and the source UE re-initiates a normal service request to the target UE. In this way, a service delay is large, which deteriorates service experience of a user, and causes more signaling overheads to an operator's network because a service is performed twice repeatedly.

SUMMARY

The present invention provides a bearer establishment method, a base station, a packet data gateway, and a computer system, so as to reduce a service delay.

A first aspect of the present invention provides a bearer establishment method, including:

receiving a device to device D2D mode indication requested by an application function entity or a proximity service server for a source user equipment, where the D2D mode indication includes a first D2D connection establishment mode or a second D2D connection establishment mode; and according to the D2D mode indication, when a D2D connection can be established successfully, establishing the D2D connection for the source user equipment; or according to the D2D mode indication, when the D2D connection cannot be established successfully, establishing a common connection for the source user equipment if the D2D mode indication is the first D2D connection establishment mode, and feeding back a connection establishment failure response to the application function entity or the proximity service server if the D2D mode indication is the second D2D connection establishment mode.

A second aspect of the present invention provides a bearer establishment method, including:

sending a device to device D2D mode indication requested by a user equipment to a base station, a packet data gateway, or a policy and charging rules function entity, where the D2D mode indication includes a first D2D connection establishment mode or a second D2D connection establishment mode, so that the base station, the packet data gateway, or the policy and charging rules function entity, according to the D2D mode indication, when the D2D connection can be established successfully, establishes the D2D connection for the user equipment; or according to the D2D mode indication, when the D2D connection cannot be established successfully, establishes a common connection for the user equipment if the D2D mode indication is the first D2D connection establishment mode, and feeds back a connection establishment failure response if the D2D mode indication is the second D2D connection establishment mode.

A third aspect of the present invention provides a base station, including:

a first receiving module, configured to: receive a device to device D2D mode indication requested by an application function entity or a proximity service server for a source user equipment, where the D2D mode indication includes a first D2D connection establishment mode or a second D2D connection establishment mode; and transfer the D2D mode indication to a first establishing module and a first feedback module;

the first establishing module, configured to: receive the D2D mode indication from the first receiving module; and according to the D2D mode indication, when the D2D connection can be established successfully, establish the D2D connection for the source user equipment, and when the D2D connection cannot be established successfully, establish a common connection for the source user equipment if the D2D mode indication is the first D2D connection establishment mode; and the first feedback module, configured to: receive the D2D mode indication from the first receiving module; and according to the D2D mode indication, when the D2D connection cannot be established successfully, feed back a connection establishment failure response to the application function entity or the proximity service server if the D2D mode indication is the second D2D connection establishment mode.

A fourth aspect of the present invention provides a packet data gateway, including:

a second receiving module, configured to: receive a device to device D2D mode indication requested by an application function entity or a proximity service server for a source user equipment, where the D2D mode indication includes a first D2D connection establishment mode or a second D2D connection establishment mode; and transfer the D2D mode indication to a second establishing module and a second feedback module;

the second establishing module, configured to: receive the D2D mode indication from the second receiving module; and according to the D2D mode indication, when the D2D connection can be established successfully, establish the D2D connection for the source user equipment, and when the D2D connection cannot be established successfully, establish a common connection for the source user equipment if the D2D mode indication is the first D2D connection establishment mode; and the second feedback module, configured to: receive the D2D mode indication from the second receiving module; and according to the D2D mode indication, when the D2D connection cannot be established successfully, feed back a connection establishment failure response to the application function entity or the proximity service server if the D2D mode indication is the second D2D connection establishment mode.

A fifth aspect of the present invention provides a policy and charging rules function entity, including:

a third receiving module, configured to: receive a device to device D2D mode indication requested by an application function entity or a proximity service server for a source user equipment, where the D2D mode indication includes a first D2D connection establishment mode or a second D2D connection establishment mode; and transfer the D2D mode indication to a third establishing module and a third feedback module;

the third establishing module, configured to: receive the D2D mode indication from the third receiving module; and according to the D2D mode indication, when the D2D connection can be established successfully, establish the D2D connection for the source user equipment, and when the D2D connection cannot be established successfully, establish a common connection for the source user equipment if the D2D mode indication is the first D2D connection establishment mode; and the third feedback module, configured to: receive the D2D mode indication from the third receiving module; and according to the D2D mode indication, when the D2D connection cannot be established successfully, feed back a connection establishment failure response to the application function entity or the proximity service server if the D2D mode indication is the second D2D connection establishment mode.

A sixth aspect of the present invention provides an application function entity, including:

a first sending module, configured to send a device to device D2D mode indication requested by a user equipment to a base station, a packet data gateway, or a policy and charging rules function entity, where the D2D mode indication includes a first D2D connection establishment mode or a second D2D connection establishment mode, so that the base station, the packet data gateway, or the policy and charging rules function entity, according to the D2D mode indication, when the D2D connection can be established successfully, establishes the D2D connection for the user equipment; or according to the D2D mode indication, when the D2D connection cannot be established successfully, establishes a common connection for the user equipment if the D2D mode indication is the first D2D connection establishment mode, and feeds back a connection establishment failure response if the D2D mode indication is the second D2D connection establishment mode.

A seventh aspect of the present invention provides a proximity service server, including:

a second sending module, configured to send a device to device D2D mode indication requested by a user equipment to a base station, a packet data gateway, or a policy and charging rules function entity, where the D2D mode indication includes a first D2D connection establishment mode or a second D2D connection establishment mode, so that the base station, the packet data gateway, or the policy and charging rules function entity, according to the D2D mode indication, when the D2D connection can be established successfully, establishes the D2D connection for the user equipment; or according to the D2D mode indication, when the D2D connection cannot be established successfully, establishes a common connection for the user equipment if the D2D mode indication is the first D2D connection establishment mode, and feeds back a connection establishment failure response if the D2D mode indication is the second D2D connection establishment mode.

An eighth aspect of the present invention provides a computer system, including: at least one processor and a memory, where the memory is configured to store executable program code, and the processor runs, by reading the executable program code stored in the memory, a program corresponding to the executable program code, so as to:

receive a device to device D2D mode indication requested by an application function entity or a proximity service server for a source user equipment, where the D2D mode indication includes a first D2D connection establishment mode or a second D2D connection establishment mode; and according to the D2D mode indication, when the D2D connection can be established successfully, establish the D2D connection for the source user equipment; or according to the D2D mode indication, when the D2D connection cannot be established successfully, establish a common connection for the source user equipment if the D2D mode indication is the first D2D connection establishment mode, and feed back a connection establishment failure response to the application function entity or the proximity service server if the D2D mode indication is the second D2D connection establishment mode.

A ninth aspect, the present invention provides a computer system, including: at least one processor and a memory, where the memory is configured to store executable program code, and the processor runs, by reading the executable program code stored in the memory, a program corresponding to the executable program code, so as to:

send a device to device D2D mode indication requested by a user equipment to a base station, a packet data gateway, or a policy and charging rules function entity, where the D2D mode indication includes a first D2D connection establishment mode or a second D2D connection establishment mode, so that the base station, the packet data gateway, or the policy and charging rules function entity, according to the D2D mode indication, when the D2D connection can be established successfully, establishes the D2D connection for the user equipment; or according to the D2D mode indication, when the D2D connection cannot be established successfully, establishes a common connection for the user equipment if the D2D mode indication is the first D2D connection establishment mode, and feeds back a connection establishment failure response if the D2D mode indication is the second D2D connection establishment mode.

Technical effects of the present invention are as follows: A D2D mode indication requested by an application function entity or a proximity service server for a source user equipment is received, where the D2D mode indication includes a first D2D connection establishment mode or a second D2D connection establishment mode; and then, according to the D2D mode indication, when a D2D connection can be established successfully, the D2D connection is established for the source user equipment; or according to the D2D mode indication, when a D2D connection cannot be established successfully, a common connection is established for the source user equipment if the D2D mode indication is the first D2D connection establishment mode. In this case, a common connection can be established for a source user equipment when a D2D service initiated by the source user equipment cannot be implemented because a D2D link cannot be established due to a cause such as insufficient resources or a long distance between a target user equipment and the source user equipment. In this way, the source user equipment can perform a service with the target user equipment without re-initiating a service request to the target user equipment, so that a service delay can be reduced and service experience of a user can be improved; and because the service does not need to be performed twice repeatedly, signaling overheads of an operator's network can also be reduced.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
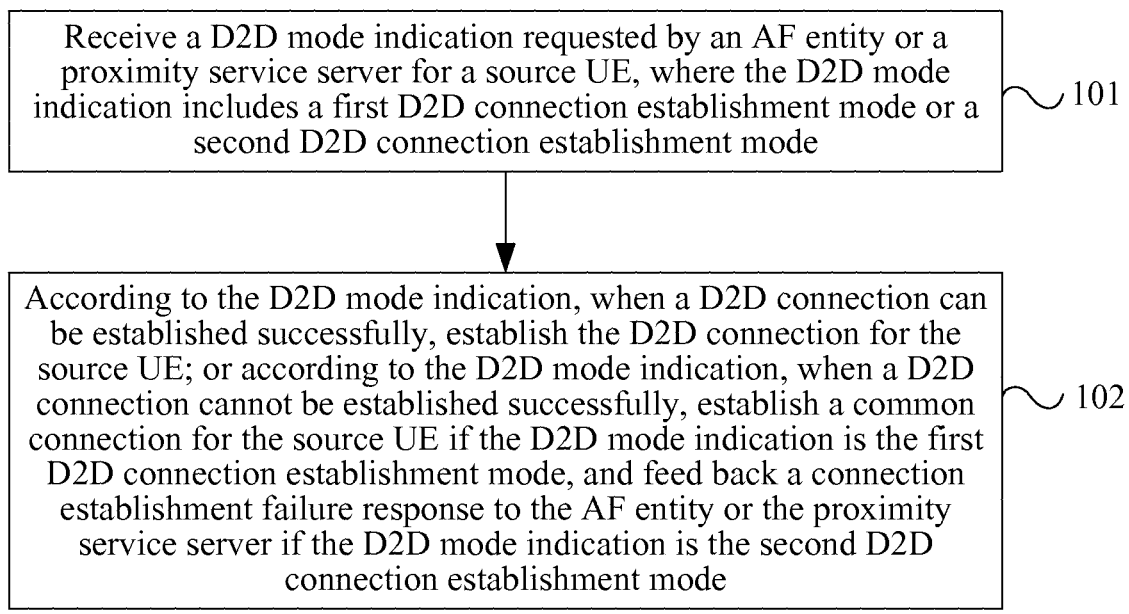
FIG. 1 is a flowchart of a bearer establishment method according to an embodiment of the present invention.

FIG. 1 is a flowchart of a bearer establishment method according to an embodiment of the present invention. As shown in FIG. 1, the bearer establishment method may include:

Step 101: Receive a D2D mode indication requested by an application function (Application Function, hereinafter referred to as AF) entity or a proximity service server (Proximity Server) for a source UE, where the D2D mode indication includes a first D2D connection establishment mode or a second D2D connection establishment mode.

The first D2D connection establishment mode is that the source UE requires that a D2D connection is established preferentially. That is, the source UE requires that a D2D connection is established preferentially, but does not require that the D2D connection must be established; and when the D2D connection cannot be established successfully, a common connection may be established for the source UE. The second D2D connection establishment mode is that the source UE requires that a D2D connection must be established. That is, the source UE requires that a D2D connection must be established; and when the D2D connection cannot be established successfully, only a connection establishment failure can be fed back and no common connection is established for the source UE.

Step 102: According to the D2D mode indication, when a D2D connection can be established successfully, establish the D2D connection for the source UE; or according to the D2D mode indication, when a D2D connection cannot be established successfully, establish a common connection for the source UE if the D2D mode indication is the first D2D connection establishment mode, and feed back a connection establishment failure response to the AF entity or the proximity service server if the D2D mode indication is the second D2D connection establishment mode.

Further, in step 102, when the D2D connection can be established successfully and after the D2D connection is established for the source UE, an entity on a network side may further feed back, to the AF entity or the proximity service server, information that a connection established for the source UE is a D2D connection.

In an implementation manner of this embodiment, that the D2D mode indication requested by the AF entity or the proximity service server for the source UE is received may be that: a base station receives a bearer establishment request or a bearer modification request sent by a packet data gateway (Packet Data Network Gateway, hereinafter referred to as PGW), where the bearer establishment request or the bearer modification request carries the D2D mode indication; the bearer establishment request is sent to the base station after the PGW receives a policy and charging control (Policy and Charging Control, hereinafter referred to as PCC) rule sent by a policy and charging rules function (Policy and Charging Rules Function, hereinafter referred to as PCRF) entity, performs D2D bearer binding on the PCC rule, and determines that a new D2D bearer needs to be established; and the bearer modification request is sent to the base station after the PGW receives a PCC rule sent by a PCRF entity, performs D2D bearer binding on the PCC rule, and determines that an existing D2D bearer needs to be modified.

The PCC rule carries the D2D mode indication, and the PCC rule further carries a service requirement of the source UE and an identifier of a target UE.

It should be noted that in this embodiment of the present invention, interaction between the base station and the PGW is transited by a mobility management entity (Mobility Management Entity, hereinafter referred to as MME)/serving gateway (Serving Gateway, hereinafter referred to as SGW) in a Long Term Evolution (Long Term Evolution, hereinafter referred to as LTE) system and transited by a serving general packet radio service (General Packet Radio Service, hereinafter referred to as GPRS) support node (Serving GPRS Support Node, hereinafter referred to as SGSN) in a universal mobile telecommunications system (Universal Mobile Telecommunications System, hereinafter referred to as UMTS) system.

In this implementation manner, that when the D2D connection cannot be established successfully, the common connection is established for the source UE if the D2D mode indication is the first D2D connection establishment mode may be that: the base station allocates, after receiving the bearer establishment request, a radio resource to the source UE to establish a D2D bearer, and if the D2D bearer cannot be established successfully, establishes a common bearer for the source UE according to the D2D mode indication; or the base station allocates, after receiving the bearer modification request, a radio resource to the source UE to modify an existing D2D bearer, and if the existing D2D bearer cannot be modified successfully, modifies an existing common bearer for the source UE according to the D2D mode indication.

Further, after establishing the common bearer for the source UE or modifying the existing common bearer for the source UE, the base station may further feed back, to the AF entity or the proximity service server by using a network, information that a connection established for the source UE is a common connection.

In this implementation manner, that according to the D2D mode indication, when the D2D connection cannot be established successfully, the connection establishment failure response is fed back to the AF entity or the proximity service server if the D2D mode indication is the second D2D connection establishment mode may be that: the base station allocates, after receiving the bearer establishment request, a radio resource to the source UE to establish a D2D bearer, and if the D2D bearer cannot be established successfully, according to the D2D mode indication, rejects the bearer establishment request, and feeds back the connection establishment failure response to the AF entity or the proximity service server; or the base station allocates, after receiving the bearer modification request, a radio resource to the source UE to modify an existing D2D bearer, and if the existing D2D bearer cannot be modified successfully, according to the D2D mode indication, rejects the bearer modification request, and feeds back the connection establishment failure response to the AF entity or the proximity service server.

In another implementation manner of this embodiment, that the D2D mode indication requested by the AF entity or the proximity service server for the source UE is received may be that: a PGW receives a PCC rule sent by a PCRF entity, where the PCC rule carries the D2D mode indication, and further, the PCC rule may further carry a service requirement of the source UE and an identifier of a target UE.

In this implementation manner, that when the D2D connection cannot be established successfully, the common connection is established for the source UE if the D2D mode indication is the first D2D connection establishment mode may be that: the PGW performs D2D bearer binding on the PCC rule, sends a bearer establishment request to a base station if it is determined that a new D2D bearer needs to be established, and sends a bearer modification request to the base station if it is determined that an existing D2D bearer needs to be modified; then, the PGW receives a rejection response that is sent by the base station to the bearer establishment request or the bearer modification request; and finally, according to the D2D mode indication, the PGW performs common bearer binding on the PCC rule again and establishes a common bearer or modifies an existing common bearer for the source UE.

Further, after establishing the common bearer or modifying the existing common bearer for the source UE, the PGW may further feed back, to the AF entity or the proximity service server by using the PCRF entity, information that a connection established for the source UE is a common connection.

In this implementation manner, that according to the D2D mode indication, when the D2D connection cannot be established successfully, the connection establishment failure response is fed back to the AF entity or the proximity service server if the D2D mode indication is the second D2D connection establishment mode may be that: the PGW performs D2D bearer binding on the PCC rule, sends a bearer establishment request to a base station if it is determined that a new D2D bearer needs to be established, and sends a bearer modification request to the base station if it is determined that an existing D2D bearer needs to be modified; then, the PGW receives a rejection response that is sent by the base station to the bearer establishment request or the bearer modification request; and finally, the PGW feeds back an execution failure of the PCC rule to the PCRF entity according to the D2D mode indication, so that the PCRF entity feeds back the connection establishment failure response to the AF entity or the proximity service server.

In the foregoing two implementation manners, the PCC rule is made for a service request and sent to the PGW after the PCRF entity receives the service request sent by the AF entity or the proximity service server, where the service request carries the service requirement of the source UE, the identifier of the target UE, and the D2D mode indication; or the PCC rule is made for a service request and sent to the PGW after the PCRF entity receives the service request sent by the AF entity or the proximity service server, queries the proximity service server for a proximity relationship between the source UE and the target UE according to the identifier of the target UE carried in the service request, and obtains, from the proximity service server, that the source UE has a proximity relationship with the target UE, where the service request further carries the service requirement of the source UE and the D2D mode indication.

In the foregoing two implementation manners, that the PGW performs D2D bearer binding on the PCC rule may be that: the PGW binds, according to the D2D mode indication and the identifier of the target UE, services for a same target UE and with a same D2D mode in a same bearer for transmission; or the PGW binds, according to the D2D mode indication, the identifier of the target UE, and a quality of service requirement in the service requirement of the source UE, services for a same target UE and with a same quality of service requirement and a same D2D mode in a same bearer for transmission.

In still another implementation manner of this embodiment, that the D2D mode indication requested by the AF entity or the proximity service server for the source UE is received may be that: a PCRF entity receives a service request sent by the AF entity or the proximity service server, where the service request carries the D2D mode indication.

In this implementation manner, the service request further carries a service requirement of the source UE and an identifier of a target UE, and that when the D2D connection cannot be established successfully, the common connection is established for the source UE if the D2D mode indication is the first D2D connection establishment mode may be that: the PCRF entity makes, for the service request, a PCC rule used for D2D communication, where the PCC rule carries the service requirement of the source UE and the identifier of the target UE; then, the PCRF entity sends the PCC rule used for D2D communication to a PGW, so that the PGW performs D2D bearer binding on the PCC rule used for D2D communication; next, the PCRF entity receives an execution failure response of the PCC rule used for D2D communication, where the execution failure response is sent by the PGW; and finally, the PCRF entity makes, for the service request and according to the D2D mode indication, a PCC rule used for common communications for the source UE, and sends the PCC rule used for common communications to the PGW, so that the PGW establishes a common bearer or modifies an existing common bearer according to the PCC rule used for common communications, so as to meet the service requirement of the source UE.

Further, after establishing the common connection for the source UE, the PCRF entity may further feed back, to the AF entity or the proximity service server, information that a connection established for the source UE is a common connection.

In this implementation manner, before the PCRF entity makes, for the service request, the PCC rule used for D2D communication, the PCRF entity may further query the proximity service server for a proximity relationship between the source UE and the target UE according to the identifier of the target UE carried in the service request, and obtain, from the proximity service server, that the source UE has a proximity relationship with the target UE.

In this implementation manner, the PCC rule used for D2D communication further carries a D2D indication, where the D2D indication is used to indicate that the PCC rule carrying the D2D indication is used for D2D communication; or the PCRF entity defines a new name for the PCC rule used for D2D communication, so as to indicate that the rule with the new name is a PCC rule used for D2D communication, and the rule with the new name does not need to carry a D2D indication.

In this implementation manner, the service request further carries the service requirement of the source UE and the identifier of the target UE, and that according to the D2D mode indication, when the D2D connection cannot be established successfully, the connection establishment failure response is fed back to the AF entity or the proximity service server if the D2D mode indication is the second D2D connection establishment mode may be that: the PCRF entity makes, for the service request, a PCC rule used for D2D communication, where the PCC rule carries the service requirement of the source UE and the identifier of the target UE; then, the PCRF entity sends the PCC rule used for D2D communication to a PGW, so that the PGW performs D2D bearer binding on the PCC rule used for D2D communication; next, the PCRF entity receives an execution failure response of the PCC rule used for D2D communication, where the execution failure response is sent by the PGW; and finally, the PCRF entity feeds back a D2D connection establishment failure to the AF entity or the proximity service server according to the D2D mode indication, so that the AF entity or the proximity service server feeds back the connection establishment failure response to the source UE.

In the foregoing embodiment, a D2D mode indication requested by an AF entity or a proximity service server for a source UE is received, where the D2D mode indication is used to indicate that the source UE requires that a D2D connection is established preferentially or the source UE requires that a D2D connection must be established; and then, according to the D2D mode indication, when a D2D connection can be established successfully, the D2D connection is established for the source UE; or according to the D2D mode indication, when a D2D connection cannot be established successfully, a common connection is established for the source UE if the D2D mode indication is a first D2D connection establishment mode. In this case, a common connection can be established for a source UE when a D2D service initiated by the source UE cannot be implemented because a D2D link cannot be established due to a cause such as insufficient resources or a long distance between a target UE and the source UE. In this way, the source UE can perform a service with the target UE without re-initiating a service request to the target UE, so that a service delay can be reduced and service experience of a user can be improved; and because the service does not need to be performed twice repeatedly, signaling overheads of an operator's network can also be reduced.

Figure 2:
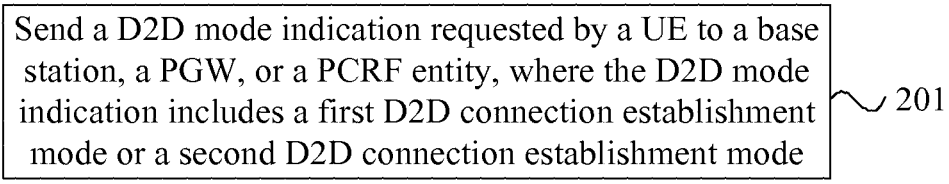
FIG. 2 is a flowchart of a bearer establishment method according to another embodiment of the present invention.

FIG. 2 is a flowchart of a bearer establishment method according to another embodiment of the present invention. As shown in FIG. 2, the bearer establishment method may include:

Step 201: Send a D2D mode indication requested by a UE to a base station, a PGW, or a PCRF entity, where the D2D mode indication includes a first D2D connection establishment mode or a second D2D connection establishment mode, so that the base station, the PGW, or the PCRF entity, according to the D2D mode indication, when a D2D connection can be established successfully, establishes the D2D connection for the UE; or according to the D2D mode indication, when the D2D connection cannot be established successfully, establishes a common connection for the UE if the D2D mode indication is the first D2D connection establishment mode, and feeds back a connection establishment failure response if the D2D mode indication is the second D2D connection establishment mode.

The first D2D connection establishment mode is that a source UE requires that a D2D connection is established preferentially. That is, the source UE requires that a D2D connection is established preferentially, but does not require that the D2D connection must be established; and when the D2D connection cannot be established successfully, a common connection may be established for the source UE. The second D2D connection establishment mode is that a source UE requires that a D2D connection must be established. That is, the source UE requires that a D2D connection must be established; and when the D2D connection cannot be established successfully, only a connection establishment failure can be fed back and no common connection is established for the source UE.

Further, after the D2D mode indication requested by the UE is sent to the base station, the PGW, or the PCRF entity, information that a connection established for the UE is a D2D connection may further be received, where the information is fed back by the base station, the PGW, or the PCRF entity, and the information that a connection established for the UE is a D2D connection is fed back after the base station, the PGW, or the PCRF entity, according to the D2D mode indication, when the D2D connection can be established successfully, establishes the D2D connection for the UE.

Further, after the D2D mode indication requested by the UE is sent to the base station, the PGW, or the PCRF entity, information that a connection established for the UE is a common connection may further be received, where the information is fed back by the base station, the PGW, or the PCRF entity, and the information that a connection established for the UE is a common connection is fed back after the base station, the PGW, or the PCRF entity, according to the D2D mode indication, when the D2D connection cannot be established successfully, establishes the common connection for the UE if the D2D mode indication is the first D2D connection establishment mode.

In the foregoing embodiment, a D2D mode indication requested by a UE is sent to a base station, a PGW, or a PCRF entity, where the D2D mode indication includes a first D2D connection establishment mode or a second D2D connection establishment mode; and then, the base station, the PGW, or the PCRF entity, according to the D2D mode indication, when a D2D connection can be established successfully, establishes the D2D connection for the UE, or according to the D2D mode indication, when a D2D connection cannot be established successfully, establishes a common connection for the UE if the D2D mode indication is the first D2D connection establishment mode. In this case, a common connection can be established for a source UE when a D2D service initiated by the source UE cannot be implemented because a D2D link cannot be established due to a cause such as insufficient resources or a long distance between a target UE and the source UE. In this way, the source UE can perform a service with the target UE without re-initiating a service request to the target UE, so that a service delay can be reduced and service experience of a user can be improved; and because the service does not need to be performed twice repeatedly, signaling overheads of an operator's network can also be reduced.

According to the bearer establishment method provided in the present invention, in a case in which a UE is more concerned about whether a service is established successfully rather than that D2D communication must be used, a service delay can be reduced, user satisfaction with the service delay can be improved, and signaling overheads of an operator's network can also be reduced.

The following introduces an implementation process of the bearer establishment method provided in the present invention in an LTE system. For an implementation process of the bearer establishment method provided in the present invention in another communications system, reference may be made to the implementation process in the LTE system by replacing a similar network element, for example, replacing a PGW with a gateway GPRS support node (Gateway GPRS Support Node, hereinafter referred to as GGSN), replacing an MME/SGW with an SGSN, and replacing an evolved NodeB (evolved NodeB, hereinafter referred to as eNB) with a radio network controller (Radio Network Controller, hereinafter referred to as RNC) or a base station (NodeB), which is not described one by one herein again.

In addition, the terms "system" and "network" in this specification may be used interchangeably in this specification. The term "and/or" in this specification is only an association relationship for describing associated objects and represents that three relationships may exist. For example, A and/or B may represent the following three cases: A exists alone, both A and B exist, and B exists alone. The symbol "/" in this specification generally represents that associated objects before and after the symbol are in an "or" relationship.

Figure 3:
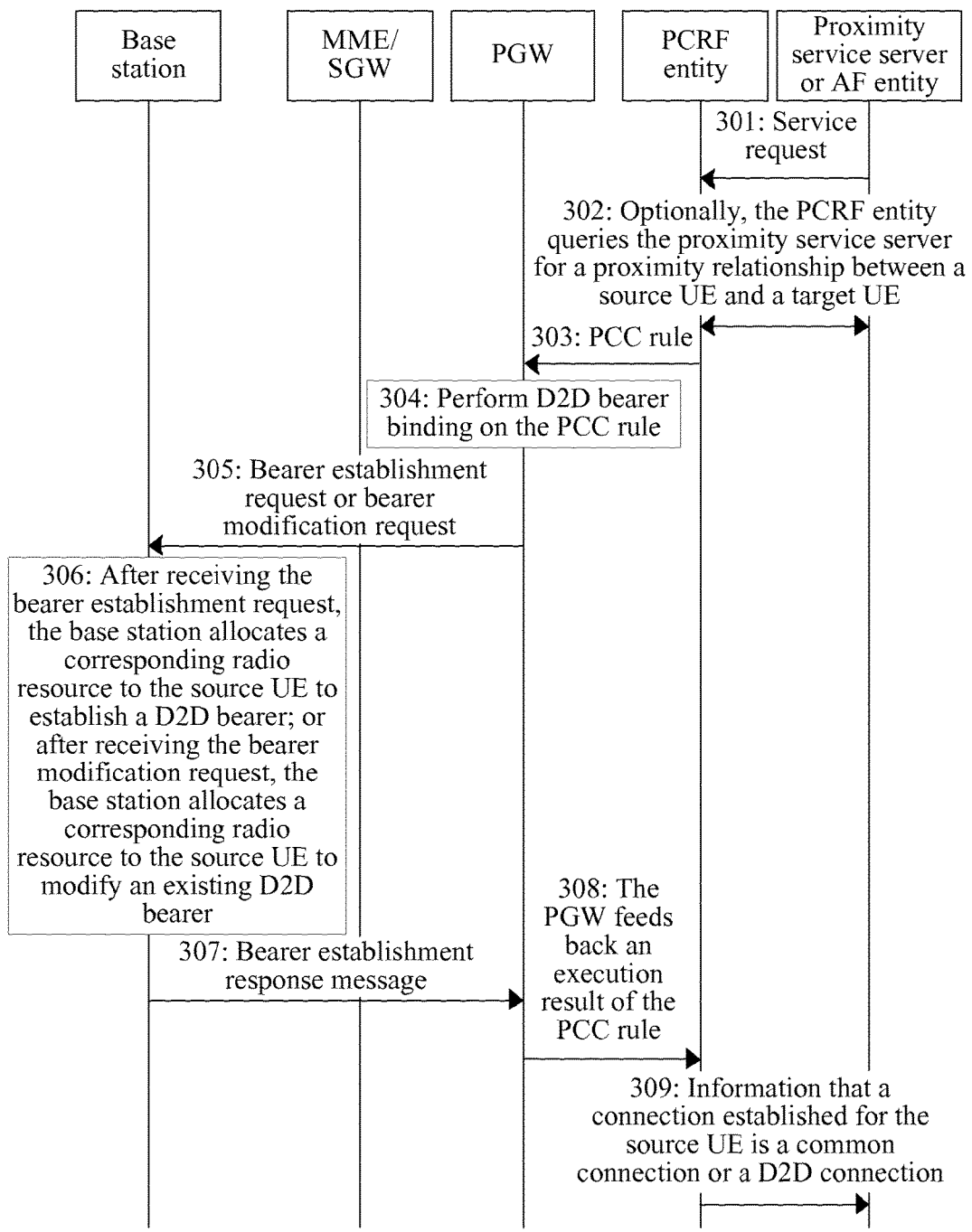
FIG. 3 is a flowchart of a bearer establishment method according to still another embodiment of the present invention.

FIG. 3 is a flowchart of a bearer establishment method according to still another embodiment of the present invention. As shown in FIG. 3, the bearer establishment method may include:

Step 301: A PCRF entity receives a service request sent by an AF entity or a proximity service server.

The service request carries a service requirement of a source UE, a D2D mode indication, and an identifier of a target UE.

The D2D mode indication includes a first D2D connection establishment mode or a second D2D connection establishment mode.

The first D2D connection establishment mode is that the source UE requires that a D2D connection is established preferentially. That is, the source UE requires that a D2D connection is established preferentially, but does not require that the D2D connection must be established; and when the D2D connection cannot be established successfully, a common connection may be established for the source UE. The second D2D connection establishment mode is that the source UE requires that a D2D connection must be established. That is, the source UE requires that a D2D connection must be established; and when the D2D connection cannot be established successfully, only a connection establishment failure can be fed back and no common connection is established for the source UE.

In this embodiment, the service request is sent to the PCRF entity after the AF entity or the proximity service server receives a service request sent by the source UE.

Step 302: Optionally, the PCRF entity queries the proximity service server for a proximity relationship between a source UE and a target UE.

If the source UE has no proximity relationship with the target UE, for a case in which the source UE requires that a D2D connection must be established, the PCRF entity rejects the service request; and for a case in which the source UE requires that a D2D connection is established preferentially, the PCRF entity decides to establish a common connection for the source UE.

Step 303: If the PCRF entity does not perform step 302, or after the PCRF entity performs step 302, the PCRF entity obtains, from the proximity service server, that the source UE has a proximity relationship with the target UE, the PCRF entity makes a PCC rule for the service request and sends the PCC rule to a PGW.

The PCC rule carries the service requirement of the source UE, the D2D mode indication, and the identifier of the target UE.

Step 304: The PGW performs D2D bearer binding on the PCC rule.

Specifically, the D2D bearer binding may be based on the D2D mode indication and the identifier of the target UE, that is, the PGW binds services for a same target UE and with a same D2D mode in a same bearer for transmission; or the D2D bearer binding may be based on the D2D mode indication, the identifier of the target UE, and a quality of service requirement in the service requirement of the source UE, that is, the PGW binds services for a same target UE and with a same quality of service requirement and a same D2D mode in a same bearer for transmission.

The quality of service requirement may be a quality of service class identifier (Quality of Service Class Identifier, hereinafter referred to as QCI) of a service and/or an allocation and retention priority (Allocation and Retention Priority, hereinafter referred to as ARP).

Step 305: The PGW determines, according to a bearer binding result, that a new D2D bearer needs to be established or an existing D2D bearer needs to be modified; when determining that a new D2D bearer needs to be established, the PGW sends a bearer establishment request to a base station by using an MME/SGW; and when determining that an existing D2D bearer needs to be modified, the PGW sends a bearer modification request to the base station by using the MME/SGW.

The bearer establishment request or the bearer modification request carries the D2D mode indication.

Step 306: After receiving the bearer establishment request, the base station allocates a corresponding radio resource to the source UE to establish a D2D bearer; if the D2D bearer can be established successfully, the base station establishes the D2D bearer for the source UE; and if the D2D bearer cannot be established successfully, for example, the radio resource is insufficient, or the base station finds that the D2D bearer cannot be established due to an actual distance between the source UE and the target UE, the base station, according to a D2D mode indication, when the D2D mode indication is a second D2D connection establishment mode, the base station rejects the bearer establishment request, and when the D2D mode indication is a first D2D connection establishment mode, the base station establishes a common bearer for the source UE.

Alternatively, after receiving the bearer modification request, the base station allocates a corresponding radio resource to the source UE to modify an existing D2D bearer; if the existing D2D bearer can be modified successfully, the base station modifies the existing D2D bearer for the source UE; and if the existing D2D bearer cannot be modified successfully, for example, the radio resource is insufficient, or the base station finds that a D2D bearer cannot be established due to an actual distance between the source UE and the target UE, the base station, according to the D2D mode indication, when the D2D mode indication is a second D2D connection establishment mode, the base station rejects the bearer modification request, and when the D2D mode indication is a first D2D connection establishment mode, the base station modifies an existing common bearer for the source UE.

Step 307: The base station feeds back a bearer establishment response message to the PGW by using the MME/SGW.

Optionally, for a case in which the D2D mode indication is the first D2D connection establishment mode, if the base station establishes the D2D bearer or modifies the existing D2D bearer successfully, the base station feeds back, in the bearer establishment response message, information that a bearer established for the source UE is a D2D bearer; and if the base station cannot establish the D2D bearer, but establishes a common bearer or modifies an existing common bearer for the UE according to the D2D mode indication, the base station feeds back, to the PGW in the bearer establishment response message, information that a bearer established for the source UE is a common bearer.

After receiving the bearer establishment response message, the PGW may perform bearer binding again according to a bearer that is actually established.

Step 308: The PGW feeds back an execution result of the PCC rule.

Optionally, for a case in which the D2D mode indication is the first D2D connection establishment mode, the PGW carries, in the execution result, information that a connection established for the source UE is a common connection or a D2D connection, and feeds back the execution result to the PCRF entity.

Step 309: Optionally, for a case in which the D2D mode indication is the first D2D connection establishment mode, after receiving the information that a connection established for the source UE is a common connection or a D2D connection, where the information is fed back by the PGW, the PCRF entity feeds back, to the AF entity or the proximity service server, the information that a connection established for the source UE is a common connection or a D2D connection, and the AF entity or the proximity service server further feeds back the information to the source UE.

In the foregoing embodiment, according to a D2D mode indication requested by a source UE, when a D2D connection can be established successfully, a base station establishes the D2D connection for the source UE, and when the D2D connection cannot be established successfully, establishes a common connection for the source UE if the D2D mode indication is a first D2D connection establishment mode. In this case, a common connection can be established for a source UE when a D2D service initiated by the source UE cannot be implemented because a D2D link cannot be established due to a cause such as insufficient resources or a long distance between a target UE and the source UE. In this way, the source UE can perform a service with the target UE without re-initiating a service request to the target UE, so that a service delay can be reduced and service experience of a user can be improved; and because the service does not need to be performed twice repeatedly, signaling overheads of an operator's network can also be reduced.

Figure 4:
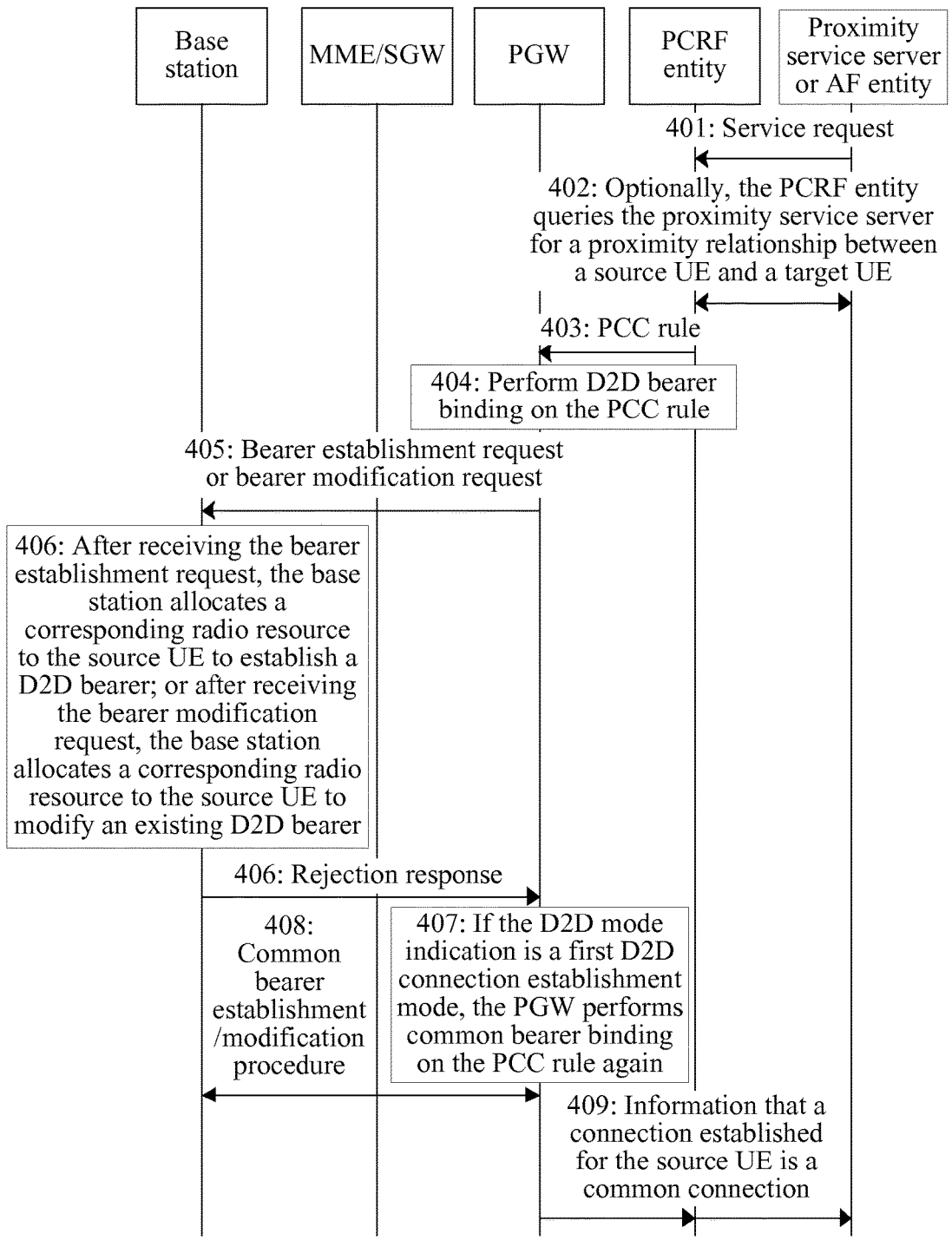
FIG. 4 is a flowchart of a bearer establishment method according to yet another embodiment of the present invention.

FIG. 4 is a flowchart of a bearer establishment method according to yet another embodiment of the present invention. As shown in FIG. 4, the bearer establishment method may include:

Step 401 to Step 404 are the same as step 301 to step 304.

Step 405: The PGW determines, according to a bearer binding result, that a new D2D bearer needs to be established or an existing D2D bearer needs to be modified; when determining that a new D2D bearer needs to be established, the PGW sends a bearer establishment request to a base station by using an MME/SGW; and when determining that an existing D2D bearer needs to be modified, the PGW sends a bearer modification request to the base station by using the MME/SGW.

Step 406: After receiving the bearer establishment request, the base station allocates a corresponding radio resource to the source UE to establish a D2D bearer; and if the D2D bearer cannot be established successfully, for example, the radio resource is insufficient, or the base station finds that the D2D bearer cannot be established due to an actual distance between the source UE and the target UE, the base station sends a rejection response to the PGW to reject the bearer establishment request.

Alternatively, after receiving the bearer modification request, the base station allocates a corresponding radio resource to the source UE to modify an existing D2D bearer; and if the existing D2D bearer cannot be modified successfully, for example, the radio resource is insufficient, or the base station finds that a D2D bearer cannot be established due to an actual distance between the source UE and the target UE, the base station sends a rejection response to the PGW to reject the bearer modification request.

Step 407: After the PGW receives the rejection response of the base station, according to a D2D mode indication, if the D2D mode indication is a second D2D connection establishment mode, the PGW feeds back an execution failure of the PCC rule to the PCRF entity, and if the D2D mode indication is a first D2D connection establishment mode, the PGW performs common bearer binding on the PCC rule again and establishes a common bearer or modifies an existing common bearer for the source UE.

Step 408: When the D2D mode indication is the first D2D connection establishment mode, after the PGW performs common bearer binding on the PCC rule again, the PGW initiates a common bearer establishment/modification procedure to the base station.

Step 409: Optionally, the PGW feeds back, to the PCRF entity, information that a connection established for the source UE is a common connection, the PCRF entity feeds back the information to the AF entity or the proximity service server, and the AF entity or the proximity service server further feeds back the information to the source UE.

In the foregoing embodiment, according to a D2D mode indication requested by a source UE, when a D2D connection can be established successfully, a PGW establishes the D2D connection for the source UE, and when the D2D connection cannot be established successfully, establishes a common connection for the source UE if the D2D mode indication is a first D2D connection establishment mode. In this case, a common connection can be established for a source UE when a D2D service initiated by the source UE cannot be implemented because a D2D link cannot be established due to a cause such as insufficient resources or a long distance between a target UE and the source UE. In this way, the source UE can perform a service with the target UE without re-initiating a service request to the target UE, so that a service delay can be reduced and service experience of a user can be improved; and because the service does not need to be performed twice repeatedly, signaling overheads of an operator's network can also be reduced.

Figure 5:
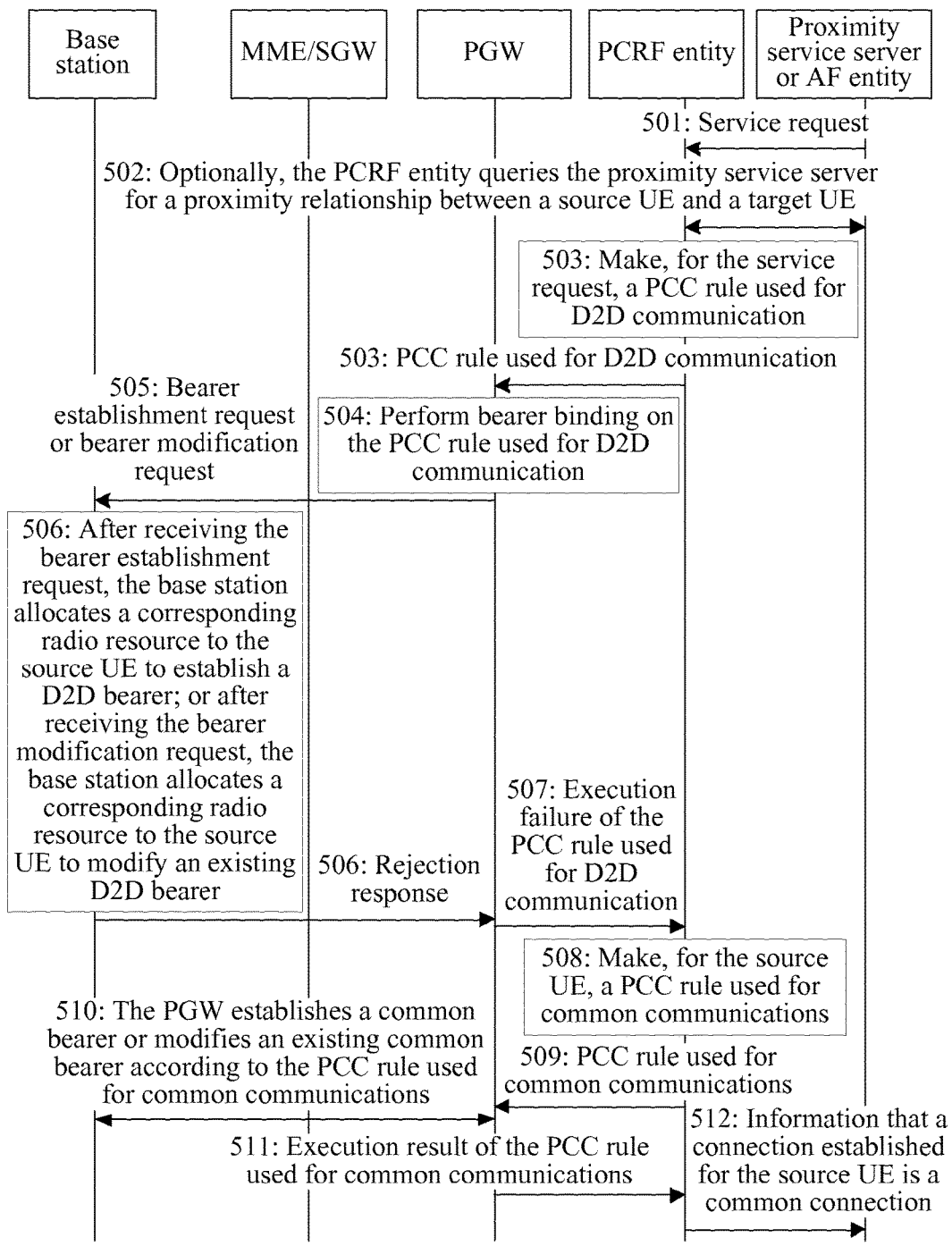
FIG. 5 is a flowchart of a bearer establishment method according to yet another embodiment of the present invention.

FIG. 5 is a flowchart of a bearer establishment method according to yet another embodiment of the present invention. As shown in FIG. 5, the bearer establishment method may include:

Step 501 and Step 502 are the same as step 301 and step 302.

Step 503: If the PCRF entity does not perform step 502, or after the PCRF entity performs step 502, the PCRF entity obtains, from the proximity service server, that the source UE has a proximity relationship with the target UE, the PCRF entity makes, for the service request, a PCC rule used for D2D communication, and sends the PCC rule used for D2D communication to a PGW.

The PCC rule used for D2D communication carries a service requirement of the source UE and an identifier of the target UE.

Further, the PCC rule used for D2D communication may further carry a D2D indication, where the D2D indication is used to indicate that the PCC rule carrying the D2D indication is used for D2D communication; or the PCRF entity may define a new name for the PCC rule used for D2D communication, so as to indicate that the rule with the new name is a PCC rule used for D2D communication, and the rule with the new name does not need to carry a D2D indication.

Step 504: The PGW performs bearer binding on the PCC rule used for D2D communication.

Specifically, the bearer binding may be based on the identifier of the target UE, that is, the PGW binds D2D services for a same target UE in a same bearer for transmission; or the D2D bearer binding may be based on the identifier of the target UE and a quality of service requirement in the service requirement of the source UE, that is, the PGW binds D2D services for a same target UE and with a same quality of service requirement in a same bearer for transmission.

The quality of service requirement may be a QCI of a service and/or an ARP.

Step 505: The PGW determines, according to a bearer binding result, that a new D2D bearer needs to be established or an existing D2D bearer needs to be modified; when determining that a new D2D bearer needs to be established, the PGW sends a bearer establishment request to a base station by using an MME/SGW; and when determining that an existing D2D bearer needs to be modified, the PGW sends a bearer modification request to the base station by using the MME/SGW.

Likewise, the bearer establishment request or the bearer modification request may also carry a D2D indication; or the PGW may define a new name for the bearer establishment request or the bearer modification request, so as to indicate, to the base station, that a bearer requested to be established/ modified is a D2D bearer. In this case, a message with the new name does not need to carry a D2D indication.

Step 506: After receiving the bearer establishment request, the base station allocates a corresponding radio resource to the source UE to establish a D2D bearer; and if the D2D bearer cannot be established successfully, for example, the radio resource is insufficient, or the base station finds that the D2D bearer cannot be established due to an actual distance between the source UE and the target UE, the base station sends a rejection response to the PGW to reject the bearer establishment request.

Alternatively, after receiving the bearer modification request, the base station allocates a corresponding radio resource to the source UE to modify an existing D2D bearer; and if the existing D2D bearer cannot be modified successfully, for example, the radio resource is insufficient, or the base station finds that a D2D bearer cannot be established due to an actual distance between the source UE and the target UE, the base station sends a rejection response to the PGW to reject the bearer modification request.

Step 507: After receiving the rejection response of the base station, the PGW feeds back, to the PCRF entity, an execution failure of the PCC rule used for D2D communication.

Step 508: The PCRF entity, according to a D2D mode indication, if the D2D mode indication is a second D2D connection establishment mode, the PCRF entity feeds back a connection establishment failure to the AF entity, and if the D2D mode indication is a first D2D connection establishment mode, the PCRF entity makes a PCC rule used for common communications for the source UE.

Step 509: The PCRF entity sends the PCC rule used for common communications to the PGW.

Step 510: The PGW establishes a common bearer or modifies an existing common bearer according to the PCC rule used for common communications, so as to meet a service requirement of the source UE.

Step 511: The PGW feeds back an execution result of the PCC rule used for common communications to the PCRF entity.

In this embodiment, the PGW may carry, in the execution result of the PCC rule used for common communications, information that a connection established for the source UE is a common connection.

Step 512: Optionally, the PCRF entity feeds back, to the AF entity or the proximity service server, information that a connection established for the source UE is a common connection, and the AF entity or the proximity service server further feeds back the information to the source UE.

In the foregoing embodiment, according to a D2D mode indication requested by a source UE, when a D2D connection can be established successfully, a PCRF entity establishes the D2D connection for the source UE, and when the D2D connection cannot be established successfully, establishes a common connection for the source UE if the D2D mode indication is a first D2D connection establishment mode. In this case, a common connection can be established for a source UE when a D2D service initiated by the source UE cannot be implemented because a D2D link cannot be established due to a cause such as insufficient resources or a long distance between a target UE and the source UE. In this way, the source UE can perform a service with the target UE without re-initiating a service request to the target UE, so that a service delay can be reduced and service experience of a user can be improved; and because the service does not need to be performed twice repeatedly, signaling overheads of an operator's network can also be reduced.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a ROM, a RAM, a magnetic disk, or an optical disc.

Figure 6:
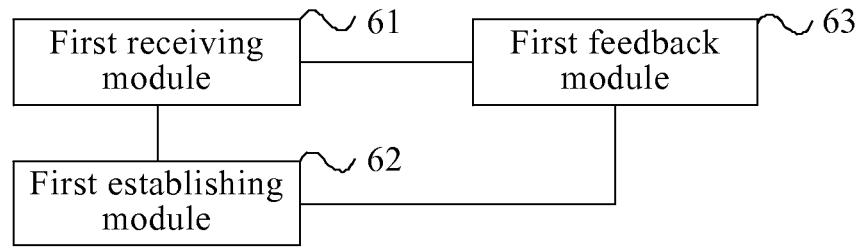
FIG. 6 is a schematic structural diagram of a base station according to an embodiment of the present invention.

FIG. 6 is a schematic structural diagram of a base station according to an embodiment of the present invention. The base station in this embodiment can implement the procedure of the embodiment shown in FIG. 1 of the present invention. As shown in FIG. 6, the base station may include a first receiving module 61, a first establishing module 62, and a first feedback module 63.

The first receiving module 61 is configured to: receive a D2D mode indication requested by an AF entity or a proximity service server for a source UE, where the D2D mode indication includes a first D2D connection establishment mode or a second D2D connection establishment mode; and transfer the D2D mode indication to the first establishing module 62 and the first feedback module 63.

The first establishing module 62 is configured to: receive the D2D mode indication from the first receiving module 61; and according to the D2D mode indication, when a D2D connection can be established successfully, establish the D2D connection for the source UE, and when the D2D connection cannot be established successfully, establish a common connection for the source UE if the D2D mode indication is the first D2D connection establishment mode.

The first feedback module 63 is configured to: receive the D2D mode indication from the first receiving module 61; and according to the D2D mode indication, when the D2D connection cannot be established successfully, feed back a connection establishment failure response to the AF entity or the proximity service server if the D2D mode indication is the second D2D connection establishment mode.

The first D2D connection establishment mode is that the source UE requires that a D2D connection is established preferentially. That is, the source UE requires that a D2D connection is established preferentially, but does not require that the D2D connection must be established; and when the D2D connection cannot be established successfully, a common connection may be established for the source UE. The second D2D connection establishment mode is that the source UE requires that a D2D connection must be established. That is, the source UE requires that a D2D connection must be established; and when the D2D connection cannot be established successfully, only a connection establishment failure can be fed back and no common connection is established for the source UE.

Further, the first feedback module 63 is further configured to: when the D2D connection can be established successfully and after the first establishing module 62 establishes the D2D connection for the source UE, feed back, to the AF entity or the proximity service server, information that a connection established for the source UE is a D2D connection.

In this embodiment, the first receiving module 61 is specifically configured to receive a bearer establishment request or a bearer modification request sent by a PGW, where the bearer establishment request or the bearer modification request carries the D2D mode indication; the bearer establishment request is sent to the base station after the PGW receives a PCC rule sent by a PCRF entity, performs D2D bearer binding on the PCC rule, and determines that a new D2D bearer needs to be established; and the bearer modification request is sent to the base station after the PGW receives a PCC rule sent by a PCRF entity, performs D2D bearer binding on the PCC rule, and determines that an existing D2D bearer needs to be modified; and the PCC rule carries the D2D mode indication, and further, the PCC rule may further carry a service requirement of the source UE and an identifier of a target UE.

In this embodiment, the first establishing module 62 is specifically configured to: allocate, after the first receiving module 61 receives the bearer establishment request, a radio resource to the source UE to establish a D2D bearer, and if the D2D bearer cannot be established successfully, establish a common bearer for the source UE according to the D2D mode indication; or allocate, after the first receiving module 61 receives the bearer modification request, a radio resource to the source UE to modify an existing D2D bearer, and if the existing D2D bearer cannot be modified successfully, modify an existing common bearer for the source UE according to the D2D mode indication.

Further, the first feedback module 63 is further configured to: after the first establishing module 62 establishes the common bearer for the source UE or modifies the existing common bearer for the source UE, feed back, to the AF entity or the proximity service server by using a network, information that a connection established for the source UE is a common connection.

In the base station, a first receiving module 61 receives a D2D mode indication requested by an AF entity or a proximity service server for a source UE, where the D2D mode indication includes a first D2D connection establishment mode or a second D2D connection establishment mode; and then, a first establishing module 62, according to the D2D mode indication, when a D2D connection can be established successfully, establishes the D2D connection for the source UE, or according to the D2D mode indication, when a D2D connection cannot be established successfully, establishes a common connection for the source UE if the D2D mode indication is the first D2D connection establishment mode. In this case, a common connection can be established for a source UE when a D2D service initiated by the source UE cannot be implemented because a D2D link cannot be established due to a cause such as insufficient resources or a long distance between a target UE and the source UE. In this way, the source UE can perform a service with the target UE without re-initiating a service request to the target UE, so that a service delay can be reduced and service experience of a user can be improved; and because the service does not need to be performed twice repeatedly, signaling overheads of an operator's network can also be reduced.

Figure 7:
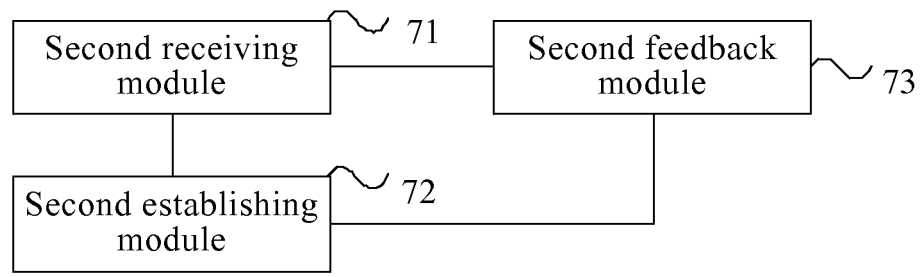
FIG. 7 is a schematic structural diagram of a packet data gateway according to an embodiment of the present invention.

FIG. 7 is a schematic structural diagram of a packet data gateway according to an embodiment of the present invention. The PGW in this embodiment can implement the procedure of the embodiment shown in FIG. 1 of the present invention. As shown in FIG. 7, the PGW may include a second receiving module 71, a second establishing module 72, and a second feedback module 73.

The second receiving module 71 is configured to: receive a D2D mode indication requested by an AF entity or a proximity service server for a source UE, where the D2D mode indication includes a first D2D connection establishment mode or a second D2D connection establishment mode; and transfer the D2D mode indication to the second establishing module 72 and the second feedback module 73.

The second establishing module 72 is configured to: receive the D2D mode indication from the second receiving module 71; and according to the D2D mode indication, when a D2D connection can be established successfully, establish the D2D connection for the source UE, and when the D2D connection cannot be established successfully, establish a common connection for the source UE if the D2D mode indication is the first D2D connection establishment mode.

The second feedback module 73 is configured to: receive the D2D mode indication from the second receiving module 71; and according to the D2D mode indication, when the D2D connection cannot be established successfully, feed back a connection establishment failure response to the AF entity or the proximity service server if the D2D mode indication is the second D2D connection establishment mode.

The first D2D connection establishment mode is that the source UE requires that a D2D connection is established preferentially. That is, the source UE requires that a D2D connection is established preferentially, but does not require that the D2D connection must be established; and when the D2D connection cannot be established successfully, a common connection may be established for the source UE. The second D2D connection establishment mode is that the source UE requires that a D2D connection must be established. That is, the source UE requires that a D2D connection must be established; and when the D2D connection cannot be established successfully, only a connection establishment failure can be fed back and no common connection is established for the source UE.

Further, the second feedback module 73 is further configured to: when the D2D connection can be established successfully and after the second establishing module 72 establishes the D2D connection for the source UE, feed back, to the AF entity or the proximity service server, information that a connection established for the source UE is a D2D connection.

In this embodiment, the second receiving module 71 is specifically configured to receive a PCC rule sent by a PCRF entity, where the PCC rule carries the D2D mode indication, and further, the PCC rule may further carry a service requirement of the source UE and an identifier of a target UE.

In the PGW, a second receiving module 71 receives a D2D mode indication requested by an AF entity or a proximity service server for a source UE, where the D2D mode indication includes a first D2D connection establishment mode or a second D2D connection establishment mode; and then, a second establishing module 72, according to the D2D mode indication, when a D2D connection can be established successfully, establishes the D2D connection for the source UE, or according to the D2D mode indication, when a D2D connection cannot be established successfully, establishes a common connection for the source UE if the D2D mode indication is the first D2D connection establishment mode. In this case, a common connection can be established for a source UE when a D2D service initiated by the source UE cannot be implemented because a D2D link cannot be established due to a cause such as insufficient resources or a long distance between a target UE and the source UE. In this way, the source UE can perform a service with the target UE without re-initiating a service request to the target UE, so that a service delay can be reduced and service experience of a user can be improved; and because the service does not need to be performed twice repeatedly, signaling overheads of an operator's network can also be reduced.

Figure 8:
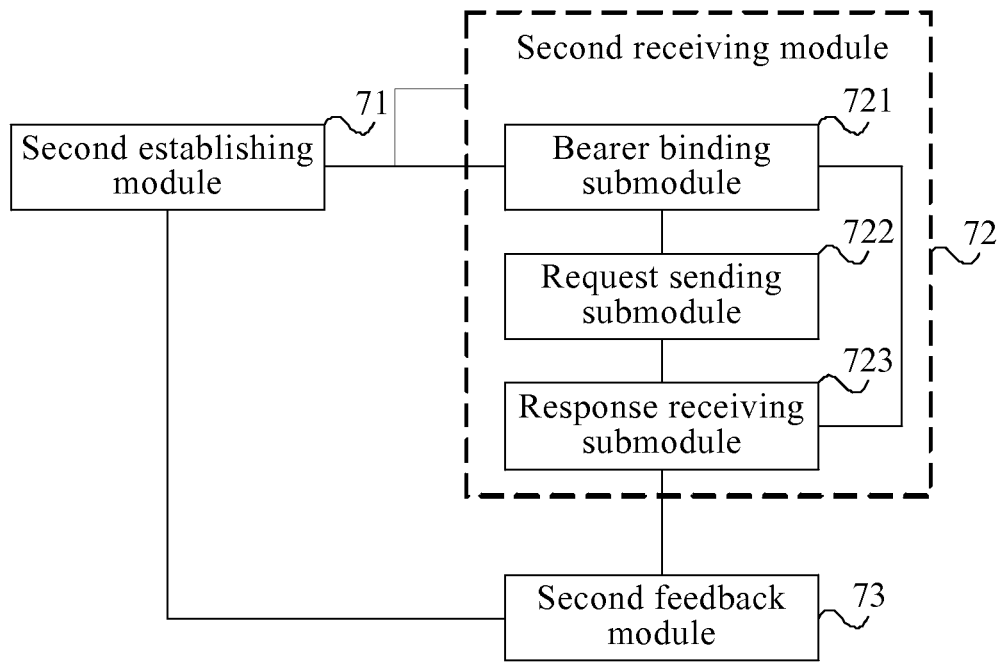
FIG. 8 is a schematic structural diagram of a packet data gateway according to another embodiment of the present invention.

FIG. 8 is a schematic structural diagram of a packet data gateway according to another embodiment of the present invention. Compared with the PGW shown in FIG. 7, in the PGW shown in FIG. 8, the second establishing module 72 may include a bearer binding submodule 721, a request sending submodule 722, and a response receiving submodule 723.

The bearer binding submodule 721 is configured to perform D2D bearer binding on the PCC rule received by the second receiving module 71.

The request sending submodule 722 is configured to: when the bearer binding submodule 721 determines that a new D2D bearer needs to be established, send a bearer establishment request to a base station; and when the bearer binding submodule 721 determines that an existing D2D bearer needs to be modified, send a bearer modification request to the base station.

The response receiving submodule 723 is configured to receive a rejection response that is sent by the base station to the bearer establishment request or the bearer modification request.

The bearer binding submodule 721 is further configured to: according to the D2D mode indication, perform common bearer binding on the PCC rule again and establish a common bearer or modify an existing common bearer for the source UE.

Further, in this embodiment, the second feedback module 73 is further configured to: after the bearer binding submodule 721 establishes the common bearer or modifies the existing common bearer for the source UE, feed back, to the AF entity or the proximity service server by using the PCRF entity, information that a connection established for the source UE is a common connection.

The bearer binding submodule 721 is specifically configured to: bind, according to the D2D mode indication and the identifier of the target UE, services for a same target UE and with a same D2D mode in a same bearer for transmission; or bind, according to the D2D mode indication, the identifier of the target UE, and a quality of service requirement in the service requirement of the source UE, services for a same target UE and with a same quality of service requirement and a same D2D mode in a same bearer for transmission.

According to the PGW, a service delay can be reduced and service experience of a user can be improved, and further, signaling overheads of an operator's network can be reduced.

Figure 9:
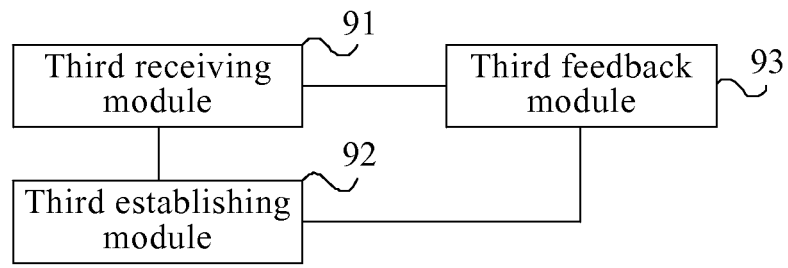
FIG. 9 is a schematic structural diagram of a policy and charging rules function entity according to an embodiment of the present invention.

FIG. 9 is a schematic structural diagram of a policy and charging rules function entity according to an embodiment of the present invention. The PCRF entity in this embodiment can implement the procedure of the embodiment shown in FIG. 1 of the present invention. As shown in FIG. 9, the PCRF entity may include a third receiving module 91, a third establishing module 92, and a third feedback module 93.

The third receiving module 91 is configured to: receive a D2D mode indication requested by an AF entity or a proximity service server for a source UE, where the D2D mode indication includes a first D2D connection establishment mode or a second D2D connection establishment mode; and transfer the D2D mode indication to the third establishing module 92 and the third feedback module 93.

The third establishing module 92 is configured to: receive the D2D mode indication from the third receiving module 91; and according to the D2D mode indication, when a D2D connection can be established successfully, establish the D2D connection for the source UE, and when the D2D connection cannot be established successfully, establish a common connection for the source UE if the D2D mode indication is the first D2D connection establishment mode.

The third feedback module 93 is configured to: receive the D2D mode indication from the third receiving module 91; and according to the D2D mode indication, when the D2D connection cannot be established successfully, feed back a connection establishment failure response to the AF entity or the proximity service server if the D2D mode indication is the second D2D connection establishment mode.

The first D2D connection establishment mode is that the source UE requires that a D2D connection is established preferentially. That is, the source UE requires that a D2D connection is established preferentially, but does not require that the D2D connection must be established; and when the D2D connection cannot be established successfully, a common connection may be established for the source UE. The second D2D connection establishment mode is that the source UE requires that a D2D connection must be established. That is, the source UE requires that a D2D connection must be established; and when the D2D connection cannot be established successfully, only a connection establishment failure can be fed back and no common connection is established for the source UE.

Further, the third feedback module 93 is further configured to: when the D2D connection can be established successfully and after the third establishing module 92 establishes the D2D connection for the source UE, feed back, to the AF entity or the proximity service server, information that a connection established for the source UE is a D2D connection.

In this embodiment, the third receiving module 91 is specifically configured to receive a service request sent by the AF entity or the proximity service server, where the service request carries the D2D mode indication.

In the PCRF entity, a third receiving module 91 receives a D2D mode indication requested by an AF entity or a proximity service server for a source UE, where the D2D mode indication includes a first D2D connection establishment mode or a second D2D connection establishment mode; and then, a third establishing module 92, according to the D2D mode indication, when a D2D connection can be established successfully, establishes the D2D connection for the source UE, or according to the D2D mode indication, when a D2D connection cannot be established successfully, establishes a common connection for the source UE if the D2D mode indication is the first D2D connection establishment mode. In this case, a common connection can be established for a source UE when a D2D service initiated by the source UE cannot be implemented because a D2D link cannot be established due to a cause such as insufficient resources or a long distance between a target UE and the source UE. In this way, the source UE can perform a service with the target UE without re-initiating a service request to the target UE, so that a service delay can be reduced and service experience of a user can be improved; and because the service does not need to be performed twice repeatedly, signaling overheads of an operator's network can also be reduced.

Figure 10:
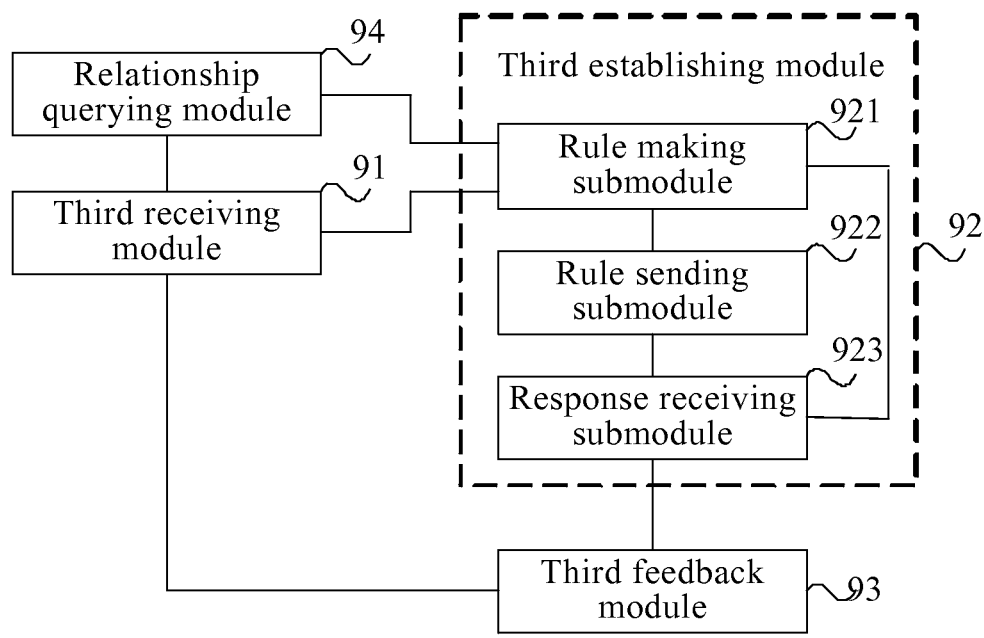
FIG. 10 is a schematic structural diagram of a policy and charging rules function entity according to another embodiment of the present invention.

FIG. 10 is a schematic structural diagram of a policy and charging rules function entity according to another embodiment of the present invention. Compared with the PCRF entity shown in FIG. 9, a difference lies in that in the PCRF entity shown in FIG. 10, the third establishing module 92 may include a rule making submodule 921, a rule sending submodule 922, and a response receiving submodule 923.

In this embodiment, the service request received by the third receiving module 91 further carries a service requirement of the source UE and an identifier of a target UE.

The rule making submodule 921 is configured to: make, for the service request received by the third receiving module 91, a PCC rule used for D2D communication; and transfer, to the rule sending submodule 922, the PCC rule used for D2D communication, where the PCC rule carries the service requirement of the source UE and the identifier of the target UE.

The rule sending submodule 922 is configured to: receive the PCC rule used for D2D communication from the rule making submodule 921; and send the PCC rule used for D2D communication to a PGW, so that the PGW performs D2D bearer binding on the PCC rule used for D2D communication.

The response receiving submodule 923 is configured to receive an execution failure response of the PCC rule used for D2D communication, where the execution failure response is sent by the PGW.

The rule making submodule 921 is further configured to: after the response receiving submodule 923 receives the execution failure response, make, for the service request and according to the D2D mode indication, a PCC rule used for common communications for the source UE, and transfer the PCC rule used for common communications to the rule sending submodule 922.

The rule sending submodule 922 is further configured to: receive the PCC rule used for common communications from the rule making submodule 921; and send the PCC rule used for common communications to the PGW, so that the PGW establishes a common bearer or modify an existing common bearer according to the PCC rule used for common communications, so as to meet the service requirement of the source UE.

Further, the third feedback module 93 is further configured to: after the third establishing module 92 establishes the common connection for the source UE, feed back, to the AF entity or the proximity service server, information that a connection established for the source UE is a common connection.

Further, the PCRF entity may further include:

a relationship querying module 94, configured to: before the rule making submodule 921 makes the PCC rule used for D2D communication, query the proximity service server for a proximity relationship between the source UE and the target UE according to the identifier of the target UE carried in the service request, and obtain, from the proximity service server, that the source UE has a proximity relationship with the target UE.

According to the PCRF entity, a service delay can be reduced and service experience of a user can be improved, and further, signaling overheads of an operator's network can be reduced.

Figure 11:
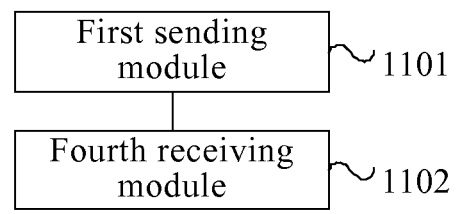
FIG. 11 is a schematic structural diagram of an application function entity according to an embodiment of the present invention.

FIG. 11 is a schematic structural diagram of an application function entity according to an embodiment of the present invention. The AF entity in this embodiment can implement the procedure of the embodiment shown in FIG. 2 of the present invention. As shown in FIG. 11, the AF entity may include:

a first sending module 1101, configured to send a D2D mode indication requested by a UE to a base station, a PGW, or a PCRF entity, where the D2D mode indication includes a first D2D connection establishment mode or a second D2D connection establishment mode, so that the base station, the PGW, or the PCRF entity, according to the D2D mode indication, when a D2D connection can be established successfully, establishes the D2D connection for the UE; or according to the D2D mode indication, when the D2D connection cannot be established successfully, establishes a common connection for the UE if the D2D mode indication is the first D2D connection establishment mode, and feeds back a connection establishment failure response if the D2D mode indication is the second D2D connection establishment mode.

The first D2D connection establishment mode is that a source UE requires that a D2D connection is established preferentially. That is, the source UE requires that a D2D connection is established preferentially, but does not require that the D2D connection must be established; and when the D2D connection cannot be established successfully, a common connection may be established for the source UE. The second D2D connection establishment mode is that a source UE requires that a D2D connection must be established. That is, the source UE requires that a D2D connection must be established; and when the D2D connection cannot be established successfully, only a connection establishment failure can be fed back and no common connection is established for the source UE.

Further, in an implementation manner of this embodiment, the AF entity may further include:

a fourth receiving module 1102, configured to: after the first sending module 1101 sends the D2D mode indication, receive information that a connection established for the UE is a D2D connection, where the information is fed back by the base station, the PGW, or the PCRF entity, and the information that a connection established for the UE is a D2D connection is fed back after the base station, the PGW, or the PCRF entity, according to the D2D mode indication, when the D2D connection can be established successfully, establishes the D2D connection for the UE.

Further, the fourth receiving module 1102 is further configured to: after the first sending module 1101 sends the D2D mode indication, receive information that a connection established for the UE is a common connection, where the information is fed back by the base station, the PGW, or the PCRF entity, and the information that a connection established for the UE is a common connection is fed back after the base station, the PGW, or the PCRF entity, according to the D2D mode indication, when the D2D connection cannot be established successfully, establishes the common connection for the UE if the D2D mode indication is the first D2D connection establishment mode.

In the AF entity, a first sending module 1101 sends a D2D mode indication requested by a UE to a base station, a PGW, or a PCRF entity, where the D2D mode indication includes a first D2D connection establishment mode or a second D2D connection establishment mode, so that the base station, the PGW, or the PCRF entity, according to the D2D mode indication, when a D2D connection can be established successfully, establishes the D2D connection for the UE, or according to the D2D mode indication, when the D2D connection cannot be established successfully, establishes a common connection for the UE if the D2D mode indication is the first D2D connection establishment mode. In this case, a common connection can be established for a source UE when a D2D service initiated by the source UE cannot be implemented because a D2D link cannot be established due to a cause such as insufficient resources or a long distance between a target UE and the source UE. In this way, the source UE can perform a service with the target UE without re-initiating a service request to the target UE, so that a service delay can be reduced and service experience of a user can be improved; and because the service does not need to be performed twice repeatedly, signaling overheads of an operator's network can also be reduced.

Figure 12:
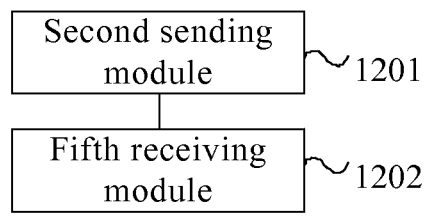
FIG. 12 is a schematic structural diagram of a proximity service server according to an embodiment of the present invention.

FIG. 12 is a schematic structural diagram of a proximity service server according to an embodiment of the present invention. The proximity service server in this embodiment can implement the procedure of the embodiment shown in FIG. 2 of the present invention. As shown in FIG. 12, the proximity service server may include:

a second sending module 1201, configured to send a D2D mode indication requested by a UE to a base station, a PGW, or a PCRF entity, where the D2D mode indication includes a first D2D connection establishment mode or a second D2D connection establishment mode, so that the base station, the PGW, or the PCRF entity, according to the D2D mode indication, when a D2D connection can be established successfully, establishes the D2D connection for the UE; or according to the D2D mode indication, when the D2D connection cannot be established successfully, establishes a common connection for the UE if the D2D mode indication is the first D2D connection establishment mode, and feeds back a connection establishment failure response if the D2D mode indication is the second D2D connection establishment mode.

The first D2D connection establishment mode is that a source UE requires that a D2D connection is established preferentially. That is, the source UE requires that a D2D connection is established preferentially, but does not require that the D2D connection must be established; and when the D2D connection cannot be established successfully, a common connection may be established for the source UE. The second D2D connection establishment mode is that a source UE requires that a D2D connection must be established.

That is, the source UE requires that a D2D connection must be established; and when the D2D connection cannot be established successfully, only a connection establishment failure can be fed back and no common connection is established for the source UE.

Further, in an implementation manner of this embodiment, the proximity service server may further include:

a fifth receiving module 1202, configured to: after the second sending module 1201 sends the D2D mode indication, receive information that a connection established for the UE is a D2D connection, where the information is fed back by the base station, the PGW, or the PCRF entity, and the information that a connection established for the UE is a D2D connection is fed back after the base station, the PGW, or the PCRF entity, according to the D2D mode indication, when the D2D connection can be established successfully, establishes the D2D connection for the UE.

Further, the fifth receiving module 1202 is further configured to: after the second sending module 1201 sends the D2D mode indication, receive information that a connection established for the UE is a common connection, where the information is fed back by the base station, the PGW, or the PCRF entity, and the information that a connection established for the UE is a common connection is fed back after the base station, the PGW, or the PCRF entity, according to the D2D mode indication, when the D2D connection cannot be established successfully, establishes the common connection for the UE if the D2D mode indication is the first D2D connection establishment mode.

In the proximity service server, a second sending module 1201 sends a D2D mode indication requested by a UE to a base station, a PGW, or a PCRF entity, where the D2D mode includes a first D2D connection establishment mode or a second D2D connection establishment mode, so that the base station, the PGW, or the PCRF entity, according to the D2D mode indication, when a D2D connection can be established successfully, establishes the D2D connection for the UE, or, according to the D2D mode indication, when the D2D connection cannot be established successfully, establishes a common connection for the UE if the D2D mode indication is the first D2D connection establishment mode. In this case, a common connection can be established for a source UE when a D2D service initiated by the source UE cannot be implemented because a D2D link cannot be established due to a cause such as insufficient resources or a long distance between a target UE and the source UE. In this way, the source UE can perform a service with the target UE without re-initiating a service request to the target UE, so that a service delay can be reduced and service experience of a user can be improved; and because the service does not need to be performed twice repeatedly, signaling overheads of an operator's network can also be reduced.

Figure 13:
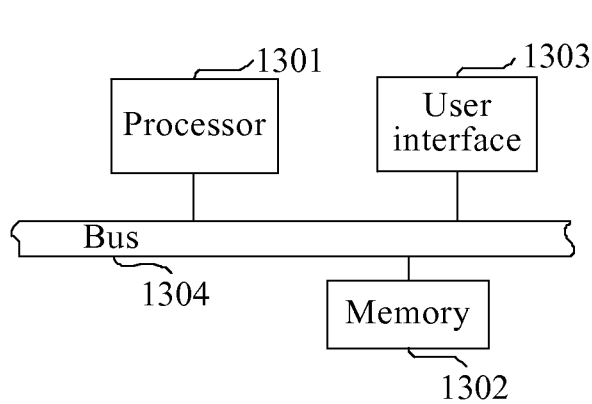
FIG. 13 is a schematic structural diagram of a computer system according to an embodiment of the present invention.

FIG. 13 is a schematic structural diagram of a computer system according to an embodiment of the present invention. The computer system in this embodiment can implement the procedure of the embodiment shown in FIG. 1 of the present invention.

As shown in FIG. 13, the computer system may include at least one processor 1301 and a memory 1302, where the memory 1302 is configured to store executable program code, and the processor 1301 runs, by reading the executable program code stored in the memory 1301, a program corresponding to the executable program code, so as to:

receive a D2D mode indication requested by an AF entity or a proximity service server for a source UE, where the D2D mode indication includes a first D2D connection establishment mode or a second D2D connection establishment mode; and according to the D2D mode indication, when a D2D connection can be established successfully, establish the D2D connection for the source UE; or according to the D2D mode indication, when a D2D connection cannot be established successfully, establish a common connection for the source UE if the D2D mode indication is the first D2D connection establishment mode, and feed back a connection establishment failure response to the AF entity or the proximity service server if the D2D mode indication is the second D2D connection establishment mode.

The first D2D connection establishment mode is that the source UE requires that a D2D connection is established preferentially. That is, the source UE requires that a D2D connection is established preferentially, but does not require that the D2D connection must be established; and when the D2D connection cannot be established successfully, a common connection may be established for the source UE. The second D2D connection establishment mode is that the source UE requires that a D2D connection must be established. That is, the source UE requires that a D2D connection must be established; and when the D2D connection cannot be established successfully, only a connection establishment failure can be fed back and no common connection is established for the source UE.

During specific implementation, the computer system may further include a user interface 1303 and a bus 1304. The processor 1301, the memory 1302, and the user interface 1303 are all connected to the bus 1304.

The computer system receives a D2D mode indication requested by an AF entity or a proximity service server for a source UE, where the D2D mode indication includes a first D2D connection establishment mode or a second D2D connection establishment mode; and then, according to the D2D mode indication, when a D2D connection can be established successfully, establishes the D2D connection for the source UE, or according to the D2D mode indication, when a D2D connection cannot be established successfully, establishes a common connection for the source UE if the D2D mode indication is the first D2D connection establishment mode. In this case, a common connection can be established for a source UE when a D2D service initiated by the source UE cannot be implemented because a D2D link cannot be established due to a cause such as insufficient resources or a long distance between a target UE and the source UE. In this way, the source UE can perform a service with the target UE without re-initiating a service request to the target UE, so that a service delay can be reduced and service experience of a user can be improved; and because the service does not need to be performed twice repeatedly, signaling overheads of an operator's network can also be reduced.

Figure 14:
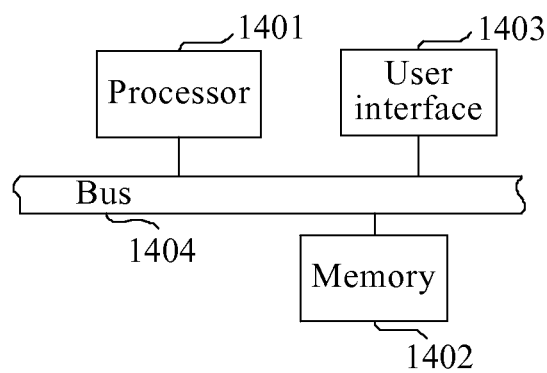
FIG. 14 is a schematic structural diagram of a computer system according to another embodiment of the present invention.

FIG. 14 is a schematic structural diagram of a computer system according to another embodiment of the present invention. The computer system in this embodiment can implement the procedure of the embodiment shown in FIG. 2 of the present invention.

As shown in FIG. 14, the computer system may include at least one processor 1401 and a memory 1402, where the memory 1402 is configured to store executable program code, and the processor 1401 runs, by reading the executable program code stored in the memory 1402, a program corresponding to the executable program code, so as to:

send a D2D mode indication requested by a UE to a base station, a PGW, or a PCRF entity, where the D2D mode indication includes a first D2D connection establishment mode or a second D2D connection establishment mode, so that the base station, the PGW, or the PCRF entity, according to the D2D mode indication, when a D2D connection can be established successfully, establishes the D2D connection for the UE; or according to the D2D mode indication, when a D2D connection cannot be established successfully, establishes a common connection for the UE if the D2D mode indication is the first D2D connection establishment mode, and feeds back a connection establishment failure response if the D2D mode indication is the second D2D connection establishment mode.

The first D2D connection establishment mode is that a source UE requires that a D2D connection is established preferentially. That is, the source UE requires that a D2D connection is established preferentially, but does not require that the D2D connection must be established; and when the D2D connection cannot be established successfully, a common connection may be established for the source UE. The second D2D connection establishment mode is that a source UE requires that a D2D connection must be established. That is, the source UE requires that a D2D connection must be established; and when the D2D connection cannot be established successfully, only a connection establishment failure can be fed back and no common connection is established for the source UE.

During specific implementation, the computer system may further include a user interface 1403 and a bus 1404. The processor 1401, the memory 1402, and the user interface 1403 are all connected to the bus 1404.

The computer system sends a D2D mode indication requested by a UE to a base station, a PGW, or a PCRF entity, where the D2D mode indication includes a first D2D connection establishment mode or a second D2D connection establishment mode, so that the base station, the PGW, or the PCRF entity, according to the D2D mode indication, when a D2D connection can be established successfully, establishes the D2D connection for the UE, or according to the D2D mode indication, when the D2D connection cannot be established successfully, establishes a common connection for the UE if the D2D mode indication is the first D2D connection establishment mode. In this case, a common connection can be established for a source UE when a D2D service initiated by the source UE cannot be implemented because a D2D link cannot be established due to a cause such as insufficient resources or a long distance between a target UE and the source UE. In this way, the source UE can perform a service with the target UE without re-initiating a service request to the target UE, so that a service delay can be reduced and service experience of a user can be improved; and because the service does not need to be performed twice repeatedly, signaling overheads of an operator's network can also be reduced.

It should be understood by a person skilled in the art that the accompanying drawings are merely schematic diagrams of an exemplary embodiment, and modules or processes in the accompanying drawings are not necessarily required for implementing the present invention.

A person skilled in the art may understand that the modules in the apparatuses provided in the embodiments may be arranged in the apparatuses in a distributed manner according to the description of the embodiments, or may be arranged in one or more apparatuses which are different from those described in the embodiments. The modules in the foregoing embodiments may be combined into one module, or may further be split into a plurality of submodules.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A bearer establishment method, comprising:
   receiving a device to device (D2D) mode indication requested by an application function entity or a proximity service server for a source user equipment (UE), the D2D mode indication indicating whether the source UE is in a first D2D connection establishment mode or a second D2D connection establishment mode, the first D2D connection establishment mode indicating that the source UE requires that a D2D connection is established preferentially over a common connection, and the second D2D connection establishment mode indicating that the source UE requires that the D2D connection must be established; and
   according to the D2D mode indication, when the D2D connection can be established successfully, establishing the D2D connection for the source UE; and
   according to the D2D mode indication, when the D2D connection cannot be established successfully:
      establishing the common connection for the source UE upon determining the D2D mode indication indicates the first D2D connection establishment mode, and
      feeding back a connection establishment failure response to the application function entity or the proximity service server upon determining the D2D mode indication indicates the second D2D connection establishment mode.

2. The method according to claim 1, further comprising:
   after the establishing the D2D connection for the source UE, feeding back, to the application function entity or the proximity service server, information that a connection established for the source UE is a D2D connection.

3. The method according to claim 1, wherein the receiving the D2D mode indication requested by an application function entity or a proximity service server for a source UE comprises:
   receiving, by a base station, a bearer establishment request or a bearer modification request sent by a packet data gateway, wherein the bearer establishment request or the bearer modification request carries the D2D mode indication, wherein:
   the bearer establishment request is sent to the base station after the packet data gateway receives a policy and charging control rule sent by a policy and charging rules function entity, performs D2D bearer binding on the policy and charging control rule, and determines that a new D2D bearer needs to be established;
   the bearer modification request is sent to the base station after the packet data gateway receives a policy and charging control rule sent by a policy and charging rules function entity, performs D2D bearer binding on the policy and charging control rule, and determines that an existing D2D bearer needs to be modified; and
   the policy and charging control rule carries the D2D mode indication, and the policy and charging control rule further carries a service requirement of the source UE and an identifier of a target UE.

4. The method according to claim 3, the establishing a common connection for the source UE comprises:
- allocating, by the base station after receiving the bearer establishment request, a radio resource to the source UE to establish a D2D bearer, and if the D2D bearer cannot be established successfully, establishing a common bearer for the source UE according to the D2D mode indication; or
- allocating, by the base station after receiving the bearer modification request, a radio resource to the source UE to modify an existing D2D bearer, and if the existing D2D bearer cannot be modified successfully, modifying an existing common bearer for the source UE according to the D2D mode indication.

5. The method according to claim 4, further comprising:
- after the establishing a common bearer for the source UE or after the modifying an existing common bearer for the source UE, further comprising, feeding back, by the base station, to the application function entity or the proximity service server by using a network, information that a connection established for the source UE is a common connection.

6. The method according to claim 3, wherein the feeding back a connection establishment failure response to the application function entity or the proximity service server comprises:
- allocating, by the base station after receiving the bearer establishment request, a radio resource to the source UE to establish a D2D bearer, and if the D2D bearer cannot be established successfully, according to the D2D mode indication, rejecting the bearer establishment request, and feeding back the connection establishment failure response to the application function entity or the proximity service server; or
- allocating, by the base station after receiving the bearer modification request, a radio resource to the source UE to modify an existing D2D bearer, and if the existing D2D bearer cannot be modified successfully, according to the D2D mode indication, rejecting the bearer modification request, and feeding back the connection establishment failure response to the application function entity or the proximity service server.

7. A bearer establishment method, comprising:
- sending a device to device (D2D) mode indication requested by a user equipment (UE) to a base station, a packet data gateway, or a policy and charging rules function entity, the D2D mode indication indicating whether the UE is in a first D2D connection establishment mode or a second D2D connection establishment mode, the first D2D connection establishment mode indicating that the source UE requires that a D2D connection is established preferentially over a common connection, and the second D2D connection establishment mode indicating that the source UE requires that the D2D connection must be established, so that the base station, the packet data gateway, or the policy and charging rules function entity:
  - according to the D2D mode indication, when the D2D connection can be established successfully, establishes the D2D connection for the UE; and
  - according to the D2D mode indication, when the D2D connection cannot be established successfully:
    - establishes the common connection for the UE upon determining the D2D mode indication indicates the first D2D connection establishment mode, and
    - feeds back a connection establishment failure response upon determining the D2D mode indication indicates the second D2D connection establishment mode.

8. The method according to claim 7, further comprising:
- after the sending the D2D mode indication requested by a UE to a base station, a packet data gateway, or a policy and charging rules function entity, receiving information that a connection established for the UE is a D2D connection, wherein:
- the information is fed back by the base station, the packet data gateway, or the policy and charging rules function entity, and
- the information that a connection established for the UE is a D2D connection is fed back after the base station, the packet data gateway, or the policy and charging rules function entity, according to the D2D mode indication, when the D2D connection can be established successfully, establishes the D2D connection for the UE.

9. The method according to claim 7, further comprising:
- after the sending the D2D mode indication requested by a UE to a base station, a packet data gateway, or a policy and charging rules function entity, receiving information that a connection established for the UE is a common connection, wherein:
- the information is fed back by the base station, the packet data gateway, or the policy and charging rules function entity, and
- the information that a connection established for the UE is a common connection is fed back after the base station, the packet data gateway, or the policy and charging rules function entity, according to the D2D mode indication, when the D2D connection cannot be established successfully, establishes the common connection for the UE upon determining the D2D mode indication indicates the first D2D connection establishment mode.

10. A base station, comprising:
- at least one hardware processor;
- a memory interfaced to the at least one hardware processor, the memory including instructions controlling the at least one hardware processor to implement:
  - a first receiving module, configured to receive a device to device (D2D) mode indication requested by an application function entity or a proximity service server for a source user equipment (UE), the D2D mode indication indicating whether the source UE is in a first D2D connection establishment mode or a second D2D connection establishment mode, the first D2D connection establishment mode indicating that the source UE requires that a D2D connection is established preferentially over a common connection, and the second D2D connection establishment mode indicating that the source UE requires that the D2D connection must be established;
  - a first establishing module, configured to:
    - receive the D2D mode indication from the first receiving module;
    - according to the D2D mode indication:
      - when the D2D connection can be established successfully, establish the D2D connection for the source UE, and
      - when the D2D connection cannot be established successfully and the D2D mode indication indicates the first D2D connection establishment mode, establish a common connection for the source; and a first feedback module, configured to:
receive the D2D mode indication from the first receiving module; and
according to the D2D mode indication, when the D2D connection cannot be established successfully and the D2D mode indication indicates the second D2D connection establishment mode, feed back a connection establishment failure response to the application function entity or the proximity service server.

11. The base station according to claim 10, wherein:
the first feedback module is further configured to: when the D2D connection can be established successfully and after the first establishing module establishes the D2D connection for the source UE, feed back, to the application function entity or the proximity service server, information that a connection established for the source UE is a D2D connection.

12. The base station according to claim 10, wherein:
the first receiving module is further configured to receive a bearer establishment request or a bearer modification request sent by a packet data gateway, wherein the bearer establishment request or the bearer modification request carries the D2D mode indication, wherein:
the bearer establishment request is sent to the base station after the packet data gateway receives a policy and charging control rule sent by a policy and charging rules function entity, performs D2D bearer binding on the policy and charging control rule, and determines that a new D2D bearer needs to be established;
the bearer modification request is sent to the base station after the packet data gateway receives a policy and charging control rule sent by a policy and charging rules function entity, performs D2D bearer binding on the policy and charging control rule, and determines that an existing D2D bearer needs to be modified; and
the policy and charging control rule carries the D2D mode indication, and the policy and charging control rule further carries a service requirement of the source UE and an identifier of a target UE.

13. The base station according to claim 12, wherein:
the first establishing module is further configured to: allocate, after the first receiving module receives the bearer establishment request, a radio resource to the source UE to establish a D2D bearer, and if the D2D bearer cannot be established successfully, establish a common bearer for the source UE according to the D2D mode indication; or allocate, after the first receiving module receives the bearer modification request, a radio resource to the source UE to modify an existing D2D bearer, and if the existing D2D bearer cannot be modified successfully, modify an existing common bearer for the source UE according to the D2D mode indication.

14. The base station according to claim 13, wherein:
the first feedback module is further configured to: after the first establishing module establishes the common bearer for the source UE or modifies the existing common bearer for the source UE, feed back, to the application function entity or the proximity service server by using a network, information that a connection established for the source UE is a common connection.

* * * * *